Nov. 17, 1953
M. DE JOUETTE
MOTOR-CULTIVATOR WITH TRAILING
IMPLEMENT AND OPERATOR SEAT
Filed March 19, 1951
2,659,287
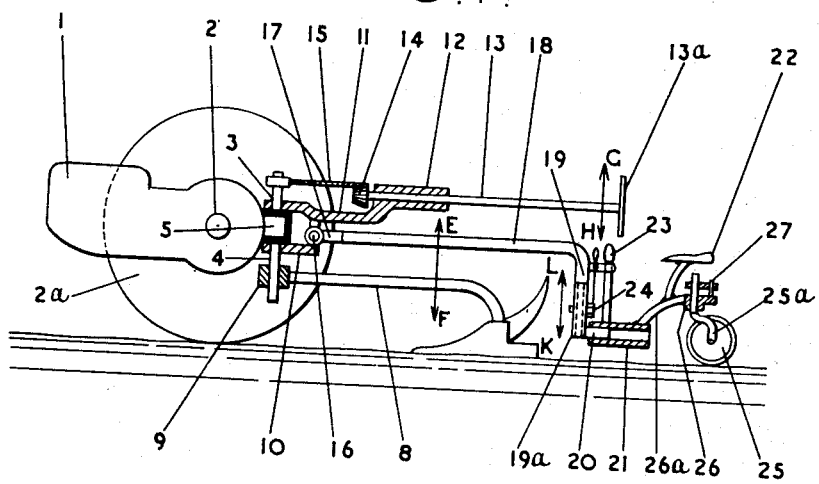
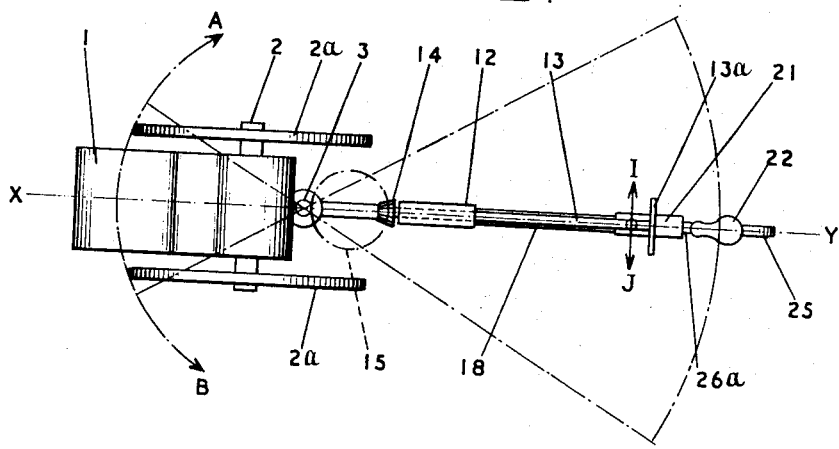
INVENTOR
Marthe de Jouette.
BY Chatwin & Company
ATTORNEYS.

Patented Nov. 17, 1953

2,659,287

UNITED STATES PATENT OFFICE 2,659,287

MOTOR-CULTIVATOR WITH TRAILING IMPLEMENT AND OPERATOR SEAT

Marthe de Jouette, Toulon, France

Application March 19, 1951, Serial No. 216,411

Claims priority, application France March 24, 1950

3 Claims. (Cl. 97—47.04)

1

The present invention relates to motor-cultivators of the kind which have a two-wheeled motor unit, a trailing working tool, and a trailing wheeled seat portion for the operator, its object being to provide an improved construction wherein the operator can steer the motor unit and raise and lower the working tool more readily than has hitherto been possible.

According to the present invention, the improved motor cultivator comprises a wheeled motor unit, a working tool pivoted thereto for horizontal movement about a vertical axis, steering means pivoted to said motor unit for horizontal movement about a vertical axis independently of the working tool, and a trailing wheeled seat portion pivoted to the steering means for vertical movement about a horizontal axis which extends transversely of the vehicle.

In the accompanying drawings, which are above all schematic and are given by way of non-limiting example of one of the forms of construction of the invention:

Figure 1 is a vertical sectional view of the apparatus.

Figure 2 is a corresponding plan.

The wheeled motor unit 1 comprises a horizontal shaft 2 on which the driving wheels are carried at each side.

At the rear of the motor unit is provided a pivot shaft having an upper vertical shaft 3 and lower vertical shaft 4, and carried on a central boss 5.

The lower shaft 4 supports a pivotal arm 8 bearing a working tool and coupled by a ring 9. A shackle 10 has two arms which pivot respectively on the upper shaft 3 and lower shaft 4.

The upper part 11 of the shackle 10 is extended by a sleeve 12 receiving a rotatable steering column 13 having at its forward extremity a bevel gear wheel 14 engaged with a toothed sector 15 keyed on the upper vertical shaft 3, and serving for steering the motor unit.

The shackle 10 also carries a horizontal pivot 16 on which is engaged a bar 17 which extends rearwardly as a horizontal rod 18 having at its extremity a vertical portion 19 consisting of two parts one of which can slide telescopically within the other and carrying at the lower end a seat mounting comprising a horizontal pin 20 receiving a rotatable horizontal sleeve 21 fast to a seat 22 and to a control lever 23, the relative rotary position of which with respect to the pin is limited and secured by engagement with a toothed sector 24 on the portion 19.

A rear wheel 25 carrying the seat mounting is connected to a vertical shaft 25a which can freely turn in the bush 26 of the support 26a and can be secured against rotation by a stop detent 27.

The operation is as follows:

With the shaft 25a secured against movement the driver seated on the seat 22 will be easily able, by manipulating the steering column 13, with the aid of the hand wheel 13a, to displace the motor unit 1 in the direction of the arrows A, B to the right or left, without the rod 18 leaving the axis X, Y.

When it is desired, on the contrary, to move the tool in the vertical direction shown by the arrows E, F, (Figure 1), for its removal from or insertion into the ground, the steering hand-wheel 13a is displaced in the direction of the arrows G, H. In this case again the rod 18, as a result of its pivotal coupling to the pivot 16, remains in the horizontal position, and the wheel 25 will not leave the ground.

Lastly, in Figure 2, when the motor-cultivator is tilted sideways on a slope, it is possible for the operator to be always kept in a vertical position by causing a rotary movement of the sleeve 21 with respect to the pin 20 by movement of the control lever 23 in the direction of the arrows I, J.

The vertical position of the sleeve 21 with respect to the rod 18 can be modified by sliding the vertical telescopic parts 19 in the direction of the arrows K, L.

I claim:

1. A motor cultivator comprising a wheeled motor unit, a working tool pivoted thereto for horizontal movement about a vertical axis, steering means pivoted to said motor unit for horizontal movement about a vertical axis independently of the working tool, and a trailing wheeled seat portion pivoted to the steering means for vertical movement about a horizontal axis which extends transversely of the vehicle.

2. A motor cultivator comprising a motor unit, a driving wheel mounted at each side thereof, a vertical pivot shaft mounted on said motor unit and having upper and lower halves, a working tool pivotally coupled to the lower half of the pivot shaft for horizontal movement, a two-arm shackle coupled pivotally on the upper and lower parts of the pivot shaft for horizontal movement, a sleeve on said shackle, a steering column rotatably carried in the sleeve and having a bevel gear wheel at its forward extremity, a toothed sector secured on the upper half of the pivot shaft and engaged with said bevel gear wheel for steering the motor unit, a rearwardly-extending horizontal rod pivoted to the shackle for vertical movement about an axis extending transversely of the shackle, a seat mounting connected to the rear end of said rod, and a rear wheel carrying said seat mounting.

3. A motor cultivator comprising a wheeled motor unit, a working tool pivoted thereto for horizontal movement about a vertical axis, steering means pivoted to said motor unit for horizontal movement about a vertical axis independently of the working tool, a rearwardly-extending horizontal rod pivoted to the steering means for vertical movement about a horizontal axis extending transversely of the steering means, a telescopic vertically-depending portion at the rear end of said rod, a horizontal pin at the lower extremity of said telescopic portion, a sleeve rotatably carried on said pin, means for securing the relative rotary positions of the pin and sleeve, a seat support secured to the sleeve, a vertical shaft journalled in said seat mounting, and a rear wheel connected to said vertical shaft and serving to carry the seat mounting.

MARTHE DE JOUETTE.

References Cited in the file of this patent

UNITED STATES PATENTS

| Number | Name | Date |
|---|---|---|
| 1,159,223 | Hoke | Nov. 2, 1915 |
| 1,343,303 | Bowen | June 15, 1920 |
| 1,439,066 | Chandler | Dec. 19, 1922 |
| 1,516,266 | Dickinson | Nov. 18, 1924 |
| 1,613,681 | Thompson | Jan. 11, 1927 |
| 1,712,162 | Parrett | May 7, 1929 |

FOREIGN PATENTS

| Number | Country | Date |
|---|---|---|
| 380,727 | Germany | Aug. 13, 1922 |
| 117,391 | Great Britain | July 18, 1918 |